United States Patent Office 3,516,806
Patented June 23, 1970

3,516,806
FUEL OIL STABILIZER
Robert E. Malec, Chicago, Ill., assignor, by mesne assignments, to Armour Industrial Chemical Company, a corporation of Delaware
No Drawing. Filed Oct. 24, 1965, Ser. No. 505,000
Int. Cl. C10l 1/22
U.S. Cl. 44—72     3 Claims

ABSTRACT OF THE DISCLOSURE

Stabilization of fuel oils by the addition of 10 to 150 mg./liter of a secondary alkyl or cycloalkyl primary amine.

---

This invention relates to novel and more effective fuel oil stabilizers. More particularly, it relates to secondary-alkyl and cycloalkyl primary amines and their use as stabilizers in fuel oil.

Distillate fuels, such as diesel oil and furnace oil tend, with time, to deteriorate due to oxidation. Such oxidation manifests itself in the appearance of darker colors, sediment, and the like. Sediment formation causes clogging of fuel system equipment such as filters, screens, nozzles, burners and other associated equipment.

The above problem is further aggravated when cracked material is blended with the distillate fuel.

The trade has devised "fuel oil stabilizers" to overcome such problems. U.S. 3,084,034 and U.S. 3,092,474 typify such effort. However, the optimum stabilizer must still be found.

An object of this invention is to provide a novel class of fuel oil stabilizers.

Another object is to provide a class of fuel oil stabilizers which are more effective.

Still another object is to provide a class of fuel oil stabilizers which are relatively inexpensive to produce.

A further object is to provide a distillate fuel which is resistant to sedimentation and sludging.

Other objects of the invention will be part be obvious and will in part appear hereinafter.

It has now been found that secondary-alkyl and cycloalkyl primary amines are very effective as fuel oil stabilizers. More particularly, it has been found that the secondary-alkyl and cycloalkyl primary amines such as derived from olefins, when used in concentrations of about 10 to 150 mg./liter stabilize distillate fuels, such as diesel oil, No. 2 oil, heater or furnace oil, kerosene, and the like. Also dispersal of deterioration products already in such fuels occurs.

The secondary-alkyl and cycloalkyl primary amines falling within the following formulas are operable:

Formula I $$R^1-(CH_2)_x-CH-(CH_2)_y-R^2$$
$$\underset{NH_2}{|}$$

wherein:

$R^1$ and $R^2$ are selected from the group consisting of hydrogen, an aryl radical, an aliphatic radical and a cycloaliphatic radical.

$x$ and $y$ are integers having a sum from 2 to 47.

The invention accordingly comprises the several steps and the relation of one or more of such steps with respect to each of the others thereof, and a composition of matter possessing the characteristics, properties, and the relation of components, which will be exemplified in the process and composition hereinafter disclosed, and the scope of the invention will be indicated in the claims.

For a fuller understanding of the nature and objects of the invention, reference should be had to the following detailed examples:

EXAMPLE I

The indicated secondary-alkyl primary amines are added to No. 2 fuel oil in the concentrations indicated.

The resultant oil composition is then subjected to the standard Nalco 300° F., 90-minute accelerated thermal stability test. This test consists of aging a sample of distillate fuel at 300° F. for 90 minutes, cooling to room temperature, and collecting any insoluble residue by vacuum filtration through a filter paper. The resultant filter paper is compared with a set of standards to obtain the numerical rating. Fuel color is determined after aging and compared with controls by the standard NPA color method.

The results are as follows:

TABLE I

| Fuel Source | Additive | Concentration, mg./liter | Rating Filter pad [1] | NPA color |
|---|---|---|---|---|
| Local | sec-$C_6$-$C_7$ alkyl primary amine | 25 | 6 | 4 |
| Do | do | 50 | 4 | 3½ |
| Do | sec-$C_7$-$C_9$ alkyl primary amine | 25 | 3 | 4 |
| Do | do | 50 | 7 | 4 |
| Do | sec-$C_9$-$C_{11}$ alkyl primary amine | 25 | 6 | 4 |
| Do | do | 50 | 3 | 3½ |
| Do | sec-$C_{11}$-$C_{15}$ alkyl primary amine | 25 | 6 | 4 |
| Do | do | 50 | 3 | 3½ |
| Do | tert-$C_{12}$-$C_{14}$ alkyl primary amine | 25 | 7 | 4 |
| Do | do | 50 | 8 | 4 |
| Do | Control | | 12 | 5 |
| Venezuela | sec-$C_{11}$-$C_{15}$ alkyl primary amine | 50 | 2 | 2½ |
| Do | tert-$C_{12}$-$C_{14}$ alkyl primary amine | 50 | 4 | 3 |
| Do | Control | | 4 | 3 |

[1] Rating: 1=best; 20=worst.

EXAMPLE II

The indicated secondary-alkyl primary amines are added to No. 2 fuel oil including a 50—50 mixture of virgin gas oil and light cycle oil in the concentration indicated.

The resultant composition is then subjected to the proposed ASTM 16-hour oxidation test. This is a test for measuring the stability of distillate fuels under accelerated oxidizing conditions. A measured volume of filtered oil is aged at a high temperature (203° F.) while oxygen is bubbled continuously through the sample. After aging and cooling, the total amount of insoluble matter formed is determined. More complete details can be found in ASTM Standards (1961) Appendix XVI.

Results of this test are as follows:

TABLE II

| Fuel Source | Additive | Concentration, mg./liter | Total gum, mg./100 ml. |
| --- | --- | --- | --- |
| Local | sec-$C_9$-$C_{11}$ alkyl primary amine | 50 | 19.4 |
| Do | sec-$C_{11}$-$C_{15}$ alkyl primary amine | 50 | 12.5 |
| Do | Control | | 246.8 |
| 50% Virgin Gas Oil, 50% Light Cycle Oil | Oleylamine | 60 | 2.1 |
| Do | tert-$C_{12}$-$C_{14}$ alkyl primary amine | 60 | 4.1 |
| Do | sec-$C_{11}$-$C_{15}$ alkyl primary amine | 60 | 1.8 |
| Do | Control | | 3.4 |

EXAMPLE III

Certain secondary-alkyl primary amines, as indicated, are added to No. 2 fuel oil in the concentration indicated.

The resultant composition is then subjected to the standard 16-week storage test at 110° F. The test is run in the dark. After the 16-week period elapses, 300 ml. samples of such aged fuel oil are filtered through tared F frit Gooch crucibles under vacuum. The gum remaining is weighed, the results being as follows:

ylamine, sec-octadecylamine, sec-cyclohexylamine, and all the isomeric and substituted versions thereof as well as mixtures of sec-alkyl and cycloalkyl primary amines and their isomeric forms such as would be derived from various unsaturated hydrocarbons including but not limited to the mixed $C_{6-7}$, the $C_{7-9}$, the $C_{9-11}$, the $C_{11-15}$, the $C_{20-48}$, the $C_{9-10}$, the $C_{11-14}$, the $C_{15-18}$, the $C_{18-20}$ sec-alkyl and cycloalkyl amines.

Generally, from 10 to 150 milligrams per liter of

2. A distillate fuel composition comprising distillate fuel and about 25 to 60 milligrams per liter of fuel of a mixture of secondary $C_{12}$ to $C_{14}$ alkyl primary amines.

3. A distillate fuel composition comprising distillate fuel and about 25 to 60 milligrams per liter of fuel of a mixture of secondary $C_{11}$ to $C_{15}$ alkyl primary amines.

References Cited

UNITED STATES PATENTS

| 1,888,023 | 11/1932 | Adams | 44—72 |
| 2,684,292 | 7/1954 | Caron et al. | 44—74 |
| 2,758,086 | 8/1956 | Stuart et al. | 44—72 XR |
| 3,254,974 | 6/1966 | Marsh et al. | 44—72 |
| 3,355,490 | 11/1967 | Van Munster | 44—72 |

DANIEL E. WYMAN, Primary Examiner

Y. H. SMITH, Assistant Examiner

U.S. Cl. X.R.

44—74; 252—401